United States Patent
Nakano et al.

(12)

(10) Patent No.: US 6,472,110 B1
(45) Date of Patent: *Oct. 29, 2002

(54) PROCESS FOR MANUFACTURING LIQUID CRYSTAL DISPLAY ELEMENT

(75) Inventors: Shigeki Nakano, Kajikawa-mura (JP); Kenji Takano, Toyosaka (JP); Akira Awaji, Toyoura-machi (JP); Takeshi Masuyama, Takatsuki (JP)

(73) Assignee: Shipley Company, L.L.C., Marlborough, MA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/710,424

(22) Filed: Sep. 17, 1996

(30) Foreign Application Priority Data

Sep. 21, 1995 (JP) .............................. 7-242919

(51) Int. Cl.⁷ ............................ G02F 1/03; G02F 1/13; H01J 9/227; H05B 33/10
(52) U.S. Cl. ............................ 430/20; 430/319; 445/24; 445/52; 216/2; 216/5; 349/20; 349/25
(58) Field of Search ......................... 216/2, 5; 430/7, 430/20; 445/24, 52; 349/49, 51, 69, 128, 132, 20, 25; 428/1

(56) References Cited

U.S. PATENT DOCUMENTS 5,419,991 A * 5/1995 Segawa .................. 430/20
5,664,982 A * 9/1997 Nakano et al. .......... 445/24

FOREIGN PATENT DOCUMENTS

| EP | 0 320 264 | * | 6/1989 |
| EP | 0 661 595 | * | 7/1995 |
| JP | 62247331  | * | 1/1987 |

OTHER PUBLICATIONS

English Translation, Japanese Kokai patent Application, Nol. Sho. 62–247331, pp. 1–15, 1987.*

* cited by examiner

*Primary Examiner*—Brenda Brumback
(74) *Attorney, Agent, or Firm*—Peter F. Corless; Darryl P. Frickey; Edwards & Angell, LLP

(57) ABSTRACT

The invention is for a process for manufacturing a liquid crystal display element for use in a color display using resist materials. The process comprises forming a transparent conductive film on one side of a transparent substrate; patterning the transparent conductive film by coating with a colored positive resist followed by exposure and development, coating a black-colored negative resist onto the transparent film; forming black stripes by subjecting the negative resist to exposure from the back side of the transparent substrate and development of the negative resist.

3 Claims, No Drawings

PROCESS FOR MANUFACTURING LIQUID CRYSTAL DISPLAY ELEMENT

BACKGROUND OF THE INVENTION

This invention relates to a process for manufacturing a liquid crystal display element of a simple matrix system, particularly to a process for forming light-shielding layers for making color stripes colored in predetermined colors display each color per picture element unit.

In a liquid crystal display element of a simple matrix system, a TN system or a STN system is used. In either system, transparent electrodes formed on two transparent substrates, respectively, are stripe-shaped. The respective stripe-shaped electrodes are arranged so that they cross at right angles through liquid crystal enclosed therebetween (when stripes arranged in one direction correspond to row, stripes arranged in the other direction correspond to column) . By giving signal voltage to row stripe electrodes and giving scanning voltage to column stripe electrodes, liquid crystal at a portion where the signal voltage is synchronized with the scanning voltage is actuated and displayed. When color display is carried out, a color filter is used. In general, a color filter is inserted between a transparent substrate and transparent electrodes. That is, a color filter is formed on a transparent substrate, and then transparent electrodes are provided thereon.

Particularly in the case of the STN system, it is necessary to form transparent electrodes on a completely smooth surface, so that a top coat layer for smoothing is provided on a color filter layer.

As color arrangement of a color filter, there may be generally used mosaic type color arrangement, stripe type color arrangement, triangle type color arrangement and 4 picture elements arrangement type color arrangement. In the case of a simple matrix system of TN or STN, stripe type color arrangement (said arrangement comprises red, green and blue stripes, and the respective stripes are separated by black light-shielding layers) is used.

In stripe type color arrangement, there is no trouble in displaying letters and figures. However, in the case of displaying an image, color tone and sharpness are poor as compared with mosaic type color arrangement or the like. In order to make image quality close to that of mosaic type color arrangement, light-shielding layers are set in the respective red, green and blue stripes per picture element unit so that the respective picture elements are surrounded with the light-shielding layers. Thus, colors are made conspicuous by surrounding the respective picture elements with black color to greatly improve image quality as compared with color display of conventional stripe type color arrangement, although color arrangement of stripe type color arrangement in which same colored picture elements are arranged in one direction, is different from color arrangement of mosaic type color arrangement in which the respective red, green and blue picture elements are surrounded with black color. However, in preparation of a color filter using stripe type color arrangement, it is a complicated step to set light-shielding layers in the respective stripes per picture element unit, and also it is necessary to carry out perfect positioning with counter electrodes (scanning electrodes in this case) and carry out steps such as mask alignment in which accuracy is required.

If light-shielding layers can be provided at a side of a substrate opposite to a substrate on which a color filter is provided, such a step is much easier than a step of directly setting shielding layers in color stripes, because it is sufficient to provide light-shielding layers between the respective stripes of a transparent conductive film formed in a stripe state as scanning electrodes. In this case, light-shielding layers are provided between the stripes generally by coating a colored light-sensitive resin on a transparent conductive film, carrying out steps of exposure using a mask and development and then removing an unnecessary resin. However, in this case, mask alignment is absolutely necessary, so that the above steps are still complicated to lower yield, which might be a reason for increase in cost.

SUMMARY OF THE INVENTION

The present invention has been made in order to solve the problems of the prior art as described above, and an object of the present invention is to provide an easy manufacturing process for manufacturing a color liquid crystal display element in which light-shielding layers are formed for making color stripes colored in predetermined colors display each color per picture element by providing light-shielding layers between the respective stripes of a transparent conductive film formed in a stripe state as scanning electrodes.

The process of the present invention comprises a step of forming a transparent conductive film on one side of one transparent substrate; a step of patterning the above transparent conductive film by coating a colored positive type resist on the above transparent conductive film and then carrying out exposure and development; a step of further coating a black-colored negative type resist thereon without peeling the above resists remaining after patterning; a step of forming black stripes between the above patterned transparent conductive films by subjecting the above negative type resist to exposure from a back side thereof through the above transparent substrate and to development; and a step of peeling the positive type resists remaining on the above patterned transparent conductive films (first process).

Further, the process of the present invention may comprise a step of forming a transparent conductive film on one side of one transparent substrate; a step of patterning the above transparent conductive film by coating a positive type resist on the above transparent conductive film and then carrying out exposure and development; a step of further injecting a black-colored resin between the above patterned resists without peeling the above resists remaining after patterning; a step of forming black stripes between the above patterned transparent conductive films by setting the above resin; and a step of peeling the above resists remaining on the above patterned transparent conductive films (second process). Here, as the above resin, a resin containing a photosetting resin or a thermosetting resin is used.

BRIEF DESCRIPTION OF THE DRAWINGS

FIG. 1 is a sectional view showing the first manufacturing process for forming light-shielding layers of the present invention in the order of steps, wherein 1 is a (transparent) substrate; 2 is a ITO film; 3 is a positive type light-sensitive resist; 4 is a mask; 5a is a negative type light-sensitive resist; and b is a black stripe as a light-shielding layer.

FIG. 2 is a sectional view showing the second manufacturing process for forming light-shielding layers of the present invention in the order of steps, wherein 5b is a thermosetting resin; and the other numerical references have the same meanings as described above.

FIG. 3 is a sectional view of the liquid crystal display element of the present invention, wherein 11 is a driving cell; 12 is a correction cell; 13 is a polarizing plate; 14 is liquid crystal for correction; 15 is liquid crystal for driving; 16 is a black stripe as a light-shielding layer; 17 is a transparent electrode as a scanning electrode; 18 is an orientation film; 19 is an orientation film; 20 is a transparent electrode as a signal electrode; 21 is a top coat layer for leveling; 22 is a color filter; 23 is a polarizing plate; and 24 is a back light.

FIG. 4 is one example of a color display pattern, wherein R is a red stripe or picture element; G is a green stripe or picture element; and B is a blue stripe or picture element.

DESCRIPTION OF THE PREFERRED EMBODIMENTS

In the first process, a positive type resist is used as a resist for forming scanning electrodes, and the resist is colored previously. Patterning of scanning electrodes is carried out by exposure and development of said resist and a step of etching a transparent conductive film. Thereafter, by coating a black-colored negative type resist and subjecting said resist to exposure from a transparent substrate side (exposure from a back side) and to development, the resists existing between the patterned scanning electrodes, i.e., stripe electrodes are set to be made light-shielding layers. Thereafter, the positive type resists remaining on the electrodes are removed. Thus, without carrying out mask alignment, light-shielding layers can be set by a relatively easy process in color stripes for color display of a liquid crystal display element of a simple matrix system per picture element unit.

It is preferred that the positive type resists existing on the patterned scanning electrodes are allowed to remain without peeling, until the light-shielding layers (black stripes) formed in the subsequent step are formed, because said resists can be used as auxiliary members (a kind of frames) for forming black stripes. Thus, without using complicated means such as mask alignment, black stripes can be formed without fail between the adjacent stripe electrodes.

Further, when exposure from a back side through the transparent substrate is carried out, light is blocked by the colored positive type resists existing between the negative type resists and the scanning electrodes, so that sufficient light does not reach the negative type resists existing on said positive type resists, whereby said negative type resists are not set sufficiently. Therefore, by using difference in solubility of the negative resists in the development step, it is possible to remove only the negative type resists on the scanning electrodes and allow only the negative type resists existing between the stripe electrodes, i.e., the portions which become light-shielding layers to remain.

In the second process, a positive type resist (it is not necessary to color the positive type resist previously, which is different from the first process) is used as a resist for forming scanning electrodes. Patterning of scanning electrodes is carried out by exposure, development and etching steps. During patterning, the positive type resists existing on the scanning electrodes are prevented from being dissolved or peeled even by these steps. Thereafter, a black-colored resin (containing a photosetting resin or a thermosetting resin) is injected between the above positive type resists, and the height of injection is adjusted so that the surface of the black-colored resin is as high as the surfaces of said resists. Thereafter, by setting the above resin, black stripe resin layers as light-shielding layers are formed between the adjacent stripe electrodes. Finally, by removing the resists remaining on the stripe electrodes by peeling, only the light-shielding layers formed between the stripe electrodes remain. Thus, without carrying out mask alignment, light-shielding layers can be set by a relatively easy process in color stripes for color display of a liquid crystal display element of a simple matrix system per picture element unit.

According to the second process, it is not necessary to carry out exposure from a back side and development. In place thereof, it is necessary to carry out setting of a black stripe-forming material (a black-colored resin) by light (whole exposure) or heat. Further, from the same reason in the first process, in the step of forming the stripe electrodes, the positive type resists existing on the stripe electrodes are allowed to remain without peeling, until black stripes are formed.

EXAMPLES

Example 1

The first manufacturing process of a liquid crystal display element for color display of the present invention, the steps of which are shown in FIG. 1, is explained below.

First, a glass substrate 1 having high surface smoothness is prepared, and a ITO film 2 is formed thereon. In Example 1, a commercially available ITO film-coated substrate having an area resistivity of 20 $\Omega/\square$ was used. On one side of this substrate was coated a colored positive type light-sensitive resist 3. As the resist, a resist obtained by dissolving or suspending a coloring matter in a material containing a novolak resin as a main component was used. As the coloring matter, there may be used a coloring matter generally used for shielding light, e.g., a coloring matter containing a pigment of blue, red, yellow or the like or a dye in combination with carbon black, a black pigment, a black dye or the like. The composition of the actually used light-sensitive resist 3 is shown below.

| | |
|---|---|
| Novolak type resist | 20 parts by weight |
| C.I. Pigment Black 7 | 4 parts by weight |
| C.I. Pigment Blue 15.6 | 5 parts by weight |
| C.I. Pigment Red 177 | 2 parts by weight |
| C.I. Pigment Yellow 139 | 1 part by weight |

This light-sensitive resist 3 was coated on the substrate 1 (FIG. 1(a), the thickness of coating was 2.0 $\mu$m). Next, the substrate on which the resist was coated was subjected to exposure by using a mask 4 (FIG. 1(b)). After development, the remaining resists were subjected to thermosetting at 130° C. to 170° C. (FIG. 1(c)). Here, if the temperature of thermosetting is lower than 130° C., a solvent is not eliminated sufficiently, so that there is a problem that setting is insufficient. If it is higher than 170° C., the resists were set too much, so that there is a problem that it is difficult to carry out peeling in the subsequent step. The portions of the ITO film 2 which were not covered with the resists were removed by etching (FIG. 1(d), thus, the portions of the ITO film 2 which were covered with the resist remaining on the substrate became scanning electrodes). A black-colored negative type light-sensitive resist 5a was coated thereon (FIG. 1(e), spin coating was used and the thickness of coating from the glass substrate was 2.0 $\mu$m). As the resist, an acrylic resist was used, and as a coloring matter, the same material and the same composition as the coloring material of the positive type resist were used. The composition is specifically shown below.

| | |
|---|---|
| Methacrylic acid/methyl methacrylate copolymer | 6 parts by weight |
| Pentaerythritol tetraacrylate | 4 parts by weight |
| Diethyl thioxanthone | 1.2 parts by weight |
| Michler's ketone | 1.2 parts by weight |
| 2-(o-Chlorophenyl)-4,5-diphenyl-imidazolyl dimer | 0.2 part by weight |
| Ethylene glycol monoethyl ether acetate | 20 parts by weight |
| C.I. Pigment Black 7 | 4 parts by weight |
| C.I. Pigment Blue 15.6 | 5 parts by weight |
| C.I. Pigment Red 177 | 2 parts by weight |
| C.I. Pigment Yellow 139 | 1 part by weight |

Thereafter, exposure from a glass side of the substrate, i.e., exposure from a back side was carried out (FIG. 1(f)). The negative type resists directly contacted with a surface of the glass were set by receiving energy of light. However, transmission of light was blocked by influence of the coloring matter, so that sufficient light did not reach the negative type resists on the positive type resists remaining on the ITO film 2, whereby said negative type resists were not set, or if setting occurred, said setting was not sufficient. By using difference in solubility in development, it was possible to remove the negative type resists on the scanning electrodes 2 through the positive type resists and allow only the resists between the stripes to remain. By removing the remaining positive type resists by peeling, all of the resists on the scanning electrodes were removed, and black stripes b as light-shielding layers were formed between the adjacent scanning electrodes 2 (FIG. 1(g), the thickness of the layers was 2.0 µm).

It is necessary that the light-shielding layers b formed between the adjacent scanning electrodes 2 have sufficiently high specific resistance. For that purpose, it is necessary to use carbon, a black pigment or the like having low conductivity as far as possible, which has high conductivity in general, or it is necessary to combine two or more kinds of coloring matters and pigments having low conductivity.

Example 2

Next, the second process is explained (see FIG. 2).

Scanning electrodes were formed in the same manner as in Example 1 except for using a resist containing a novolak resin as a main component and containing no coloring matter as the positive type light-sensitive resist 3 (FIG. 2(d)). A black-colored thermosetting resin 5b was coated thereon (FIG. 2(e), a spin coating method was used). As the thermosetting resin, a novolak type epoxy resin in which a coloring matter was dissolved or suspended was used. As the coloring matter, there may be used a coloring matter generally used for shielding light, e.g., a coloring matter containing a pigment of blue, red, yellow or the like or a dye in combination with carbon black, a black pigment, a black dye or the like. Actually used was a solution obtained by dissolving an Aniline Black dye in a PMA (propylene glycol monomethyl ether acetate) solution containing a novolak type epoxy resin (solid content: 10%). With respect to the coloring matter, attention should be paid to the same points as in the first process.

The final coating thickness was adjusted so that the coating surfaces are as high as the surfaces of the resist. Therefore, it is suitable to express the above step by using the terms "injecting the resin into valleys between the resists and then adjusting the height of injection to the height of the resist surfaces" rather than using the term "coating". In Example 2, after the resin was coated by spin coating, the surface height was adjusted by removing the resin on the resists (FIG. 2(f)). Thereafter, by setting the thermosetting resin and further removing the positive type resists by peeling, all of the resists on the scanning electrodes were removed, and black stripes b as light-shielding layers (the thickness of the layers was 1.5 µm) were formed between the adjacent scanning electrodes (FIG. 2(g)). In Example 2, a thermosetting resin was used as a resin, but it is not necessary from the scope of the present invention that the resin is limited to a thermosetting resin. A photosetting resin such as a UV setting resin may be used (not heat but light is used as a means of setting). It is possible to obtain entirely the same effect as in the case of using a thermosetting resin.

The process for preparing a substrate at a scanning electrode side of a liquid crystal display element of the present invention is described above. As a substrate at a signal electrode side, a substrate which is entirely the same as a conventional substrate is used. Therefore, the process for preparing a substrate at a signal electrode side is the same as a conventional process. A conventional color filter is provided at a signal electrode side. That is, stripe-shaped color filters are formed on a transparent substrate, and light-shielding layers are provided between the respective color stripes of Red (R), Green (G) and blue (B). After top coat layers for surface smoothing are formed on the color filters, signal electrodes of ITO are formed thereon.

FIG. 3 shows a sectional view of a liquid crystal display panel for color display manufactured by using the substrate at a scanning electrode side prepared by the process of the present invention. Actually, it is necessary to subject the respective electrode substrates to orientation treatment which forms orientation films thereon. Further, in the case of the STN system, a correction cell for color correction or a compensation film is provided thereon. The respective parts of the liquid crystal display panel of FIG. 3 are described below. 11 is a driving cell; and 12 is a correction cell. 13 and 23 are polarizing plates, 14 is liquid crystal for correction; 15 is liquid crystal for driving; and 16 is a black stripe as a light-shielding layer. 17 is a transparent electrode as a scanning electrode; 20 is a transparent electrode as a signal electrode; and 18 and 19 are orientation films. 21 is a top coat layer for leveling; 22 is a color filter; and 24 is a back light.

FIG. 4 shows a color display pattern seen from the front side of the liquid crystal display element thus manufactured. It can be seen that the respective stripes are surrounded with light-shielding layers per picture element unit, which is different from a conventional STN system color stripe pattern. By the above surrounding by the light-shielding layers, color tone which is sharp as compared with conventional color tone can be obtained.

As can be seen from Examples 1 and 2, the characteristic of the present invention resides in that surrounding of picture element unit by light-shielding layers as shown in FIG. 4 is realized by using a substrate at a scanning electrode side which has not been contributed to color display in the prior art. In general, if light-shielding layers are to be formed between adjacent scanning electrodes, after scanning electrodes are formed by patterning of ITO, steps of resist coating, mask alignment and patterning are further required. In the process of the present invention, resists (positive type resists) for first patterning of scanning electrodes are allowed to remain as such without removing and used for a next step of forming light-shielding layers. Specifically, in the first process, a positive type resist is colored previously and used as a filter for blocking transmission of light when a negative type resist for forming light-shielding layers is set by exposure. During exposure from a back side, the colored positive resists remaining on the scanning electrodes become filters, so that sufficient light does not reach the negative type resists coated on said positive type resists, whereby the negative type resists are not set by said exposure (even if the negative type resists are set, a degree thereof is extremely low). Therefore, in the next development step, only the negative type resists existing between the adjacent scanning electrodes are cured and remain, and the negative type resists on the scanning electrodes through the positive type resists described above are removed. That is, the positive type resists remaining on the scanning electrodes described above function as masks, so that light-shielding layers can be formed without using complicated means such as mask alignment. In the second process, it is not necessary to carry out operations of exposure from a back side and development. However, it is necessary to carry out operation of setting a photosetting resin or a thermosetting resin (the former: light-whole exposure, the latter: heat). As described above, developing operation is not carried out in the second process, so that the positive type resists (it is not necessary to incorporate a coloring matter therein) remaining on the scanning electrodes described above function as frames for injecting a resin which is to be made into light-shielding layers (similarly as in the first process, means such as mask alignment are not necessary).

Further, by suitably selecting the thickness of the positive type resists remaining on the scanning electrodes described above, the thickness of the light-shielding layers can be adjusted.

That is, if a thickness required as a light-shielding layer is calculated previously by means of an experiment or the like, by coating a positive type resist having a thickness which is slightly less than or the same as a calculated thickness, the resist can be used as auxiliary members when black stripes are formed. In the first process, depending on a previously calculated coating thickness of a positive type resist, the amount of a coloring matter to be incorporated in the positive type resist is controlled. Thus, it is also useful for controlling the thickness of light-shielding layers with high precision.

In Examples 1 and 2, according to a process which is generally used, conventional color filters are formed at a signal electrode side, and the light-shielding layers of the present invention are provided at a side of scanning electrodes which are counter electrodes. However, the role of the signal electrode side and the role of the scanning electrode side are not absolutely fixed. Color filters may be provided at the scanning electrode side, and the light-shielding layers of the present invention may be formed at the signal electrode side. Therefore, it is not necessary to limit the substrate on which the light-shielding layers of the present invention are formed, to a substrate at the scanning electrode side.

According to the process of the present invention, light-shielding layers can be set by a relatively easy process in color stripes for color display of a conventional liquid crystal display element of a simple matrix system per picture element unit. Color display having sharpness and color tone which are equal to those of mosaic type color arrangement can be inexpensively obtained thereby, so that it can be said that the process of the present invention is an excellent process for manufacturing a color liquid crystal display element of a simple matrix system.

Further, according to the present invention, positive type resists which are allowed to remain on scanning electrodes during patterning of the scanning electrodes can be used as auxiliary members for forming black stripes, so that without using complicated means such as mask alignment, black stripes can be formed without fail between adjacent scanning electrodes.

What is claimed is:

1. A process for manufacturing a liquid crystal display element for a color display which comprises:

forming a transparent conductive film on one side of a transparent substrate;

patterning the transparent conductive film by coating a colored light-sensitive resist on said transparent conductive film and then exposing and developing said light sensitive resist;

thermosetting said light-sensitive resist at a temperature of 130° C. up to 170° C.;

coating a black-colored negative light-sensitive resist on said patterned transparent conductive film without removal of the positive light-sensitive resist remaining following patterning;

forming black stripes between transparent conductive film by subjecting the negative light-sensitive resist to exposure from the back side of the transparent substrate followed by development of said negative light-sensitive resist;

removal of the positive light-sensitive resist remaining on the transparent conductive film.

2. A process for manufacturing a liquid crystal display element for a color display which comprises the steps of:

forming a transparent conductive film on one side of a transparent substrate;

without exposure from a back side, patterning the transparent conductive film by coating a positive light-sensitive resist onto the transparent conductive film and then exposing and developing said resist to yield a coating having valleys therein;

injecting black-colored resin into the valleys between the positive light-sensitive resist;

forming black stripes on said transparent conductive film by curing the black-colored resin; and removing the positive light-sensitive resist remaining on the transparent conductive film.

3. The process according to claim 2 wherein the black-colored resin is a thermosetting resin.

* * * * *